United States Patent [19]

Kutz

[11] Patent Number: 4,956,920
[45] Date of Patent: Sep. 18, 1990

[54] DEVICE FOR DETERMINING TRUE BEARING DURING DAYTIME

[75] Inventor: Giora Kutz, Tel Aviv, Israel

[73] Assignee: Azimuth Ltd., Israel

[21] Appl. No.: 190,729

[22] Filed: May 5, 1988

[51] Int. Cl.⁵ .............................................. G01C 17/34
[52] U.S. Cl. ........................................ 33/268; 33/227
[58] Field of Search .................. 33/268, 269, 270, 227

[56] References Cited

U.S. PATENT DOCUMENTS

| | | | |
|---|---|---|---|
| 275,913 | 4/1983 | Holmes | 33/269 |
| 538,889 | 5/1895 | Arvidson | 33/269 |
| 686,127 | 11/1901 | Potter | 33/269 |
| 709,289 | 9/1902 | Young | 33/269 |
| 2,072,565 | 3/1937 | Moehle | 33/270 |
| 2,173,545 | 9/1939 | Wall | 33/268 |
| 2,482,749 | 9/1949 | Eckert | 33/268 |
| 2,904,889 | 9/1959 | France, II | 33/268 |

FOREIGN PATENT DOCUMENTS

| | | | |
|---|---|---|---|
| 318160 | 11/1918 | Fed. Rep. of Germany | 33/268 |
| 2093 | 5/1878 | United Kingdom | 33/268 |
| 933 | 2/1882 | United Kingdom | 33/268 |
| 4990 | 12/1892 | United Kingdom | 33/268 |
| 3991 | 11/1897 | United Kingdom | 33/268 |
| 619836 | 3/1949 | United Kingdom | 33/268 |

*Primary Examiner*—Thomas B. Will
*Attorney, Agent, or Firm*—Townsend and Townsend

[57] ABSTRACT

There is proposed an instrument for determining true bearing during daytime using the sun as a reference preferably for use together and as an attachment to known angular measuring instruments, such as geniometers, the instrument consisting of a shadow producing member to produce a shadow on a reference member. The shadow is to be cast at a predetermined location on the reference member when the shadow producing member is exactly aligned with the sun.

7 Claims, 2 Drawing Sheets

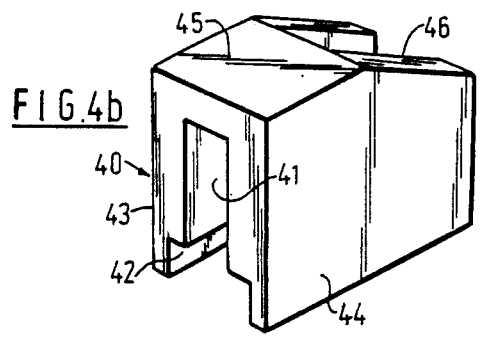
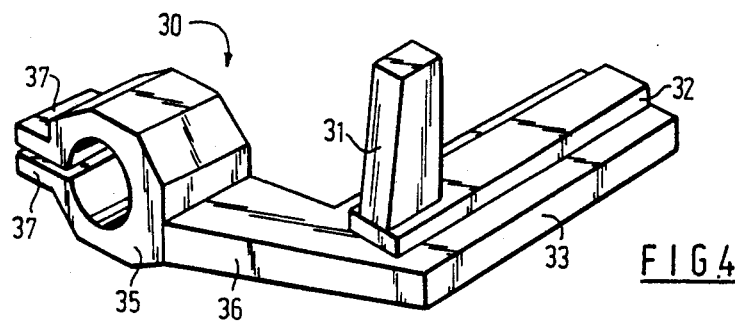
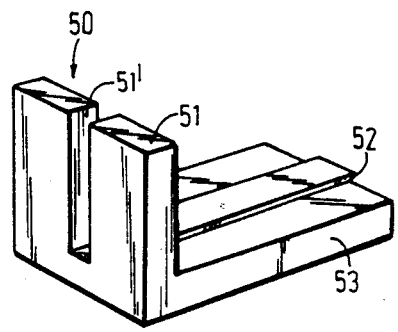
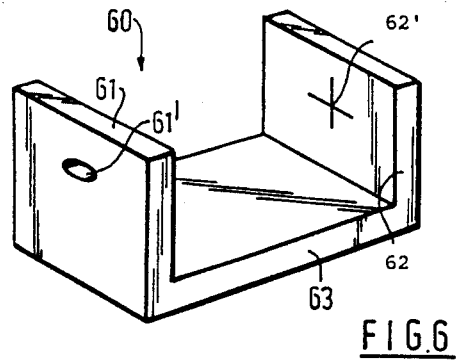

DEVICE FOR DETERMINING TRUE BEARING DURING DAYTIME

FIELD OF THE INVENTION

The present invention relates to a device for determining true bearing during daytime using the sun as a reference which also is particularly—but not exclusively—useful as an indicator attachment to angular measuring instruments. The device per se can find use e.g. for the purpose of determining the direction in which an antenna should face.

Angular measuring instruments for determining true bearing during the daytime commonly use the sun as a reference. One technique now widely used is to sight, via a smoked filter, one edge of the sun and then the opposite edge of the sun. Since this technique requires making two distinct sightings, the time interval between them, no matter how small, introduces an error in the bearing calculation.

Another technique employs an arrangement using solar insolation, the arrangement—in use thereof—being adjusted to the centre of the sun. While this arrangement is apt to avoid the error connected with the use of a smoked filter, its cost is rather costly and apart from that most delicate and likely to be easily damaged.

OBJECT OF INVENTION

An object of the present invention is to provide an instrument which permits an exact collimation to the centre of the sun. In combination with an angular measuring instrument the new instrument permits only one sighting of the sun to be made, thereby avoiding the source of error in the existing technique where two sightings are required.

SHORT SUMMARY

According to a broad aspect of the present invention, there is provided a device which comprises a shadow-producing-member and a reference member, such shadow-producing-member being positioned so as to produce a shadow by the sun on said reference member such as to have said shadow cast at a predetermined located thereon when said shadow-producing-member is exactly aligned with the sun.

In a preferred embodiment of the invention described below, the shadow-producing-member is a vertically-extending post, and the reference member includes a horizontally-extending surface on which the shadow is cast. More particularly, the vertically-extending post is fixed to the reference member to project vertically therefrom and has a width slightly less than that of the horizontally-extending surface so as to cast thereon a shadow centrally thereof and straddled by equally-dimensioned unshadowed slide margins when the vertically-extending post is exactly aligned with the sun.

It has been found that the human eye and mind can make a very quick and accurate comparison between two such margins, particularly when they are relatively close to each other and of very small thickness, to determine whether the two margins are exactly equal. When this determination is made optically, the user knows that at this instant the sighting device is exactly aligned with the sun in azimuth, i.e. in the horizontal angular direction.

The invention also provides—for those cases where the new device is employed as an attachment to an angular measuring instrument—an indicator attachable to that angular measuring instrument for determining when the sighting device of the instrument is exactly aligned with the sun.

Further features and advantages of the invention will be apparent from the description below.

SHORT DESCRIPTION OF DRAWINGS

The invention is herein described, by way of example only, as being a combination of the new instrument with an angular measuring device with reference to the accompanying drawings, wherein:

FIG. 1 schematically illustrates one form of conventional angular measuring instrument equipped with a sighting device constructed in accordance with the present invention.

FIG. 2 is a three-dimensional view of the new instrument being attached to the sighting device in the instrument of FIG. 1, which attachment provides an accurate indication when the sighting device is exactly aligned with the sun.

FIG. 3 schematically illustrates an angular measuring instrument equipped with another form of indicator constructed in accordance with the present invention.

FIGS. 4a and 4b illustrate the construction of the two main components of the indicator attachment included in the instrument of FIG. 3, and FIGS. 5 and 6 illustrate two other forms of indicators which may be used in accordance with the present invention.

DESCRIPTION OF PREFERRED EMBODIMENT

Figure 1:
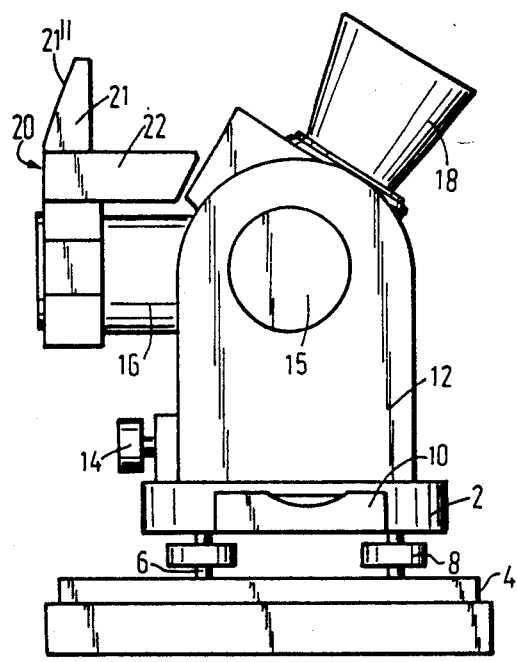

The angular measuring instrument illustrated in FIG. 1 may be of any of the conventional constructions such as are used in making position surveys, navigation and the like for determining the bearing of a specific object with respect to a reference direction. During the daytime, the sun may be used as the reference, and during the nighttime, another star, such as the Pole Star, having a known offset from the true North may be used as the reference.

Angular measuring instruments of the foregoing type, also commonly called goniometers, generally include a table 2 mounted to a horizontal base 4 by a plurality of legs 6 which are adjustable by knobs 8 to bring table 2 in precise horizontal position as indicated by a spirit level indicator 10. Such instruments also generally include a head 12 mounted for rotation about a vertical axis under the control of knob 14, and also for rotation about a horizontal axis under the control of knob 15. Head 12 includes a sighting device, generally in the form of a telescope 16 for sighting the reference, e.g. the sun, and an eye piece 18 viewable by the user during the sighting operations.

Such angular measuring instruments commonly include many other elements for providing various types of information during the use of the instrument. However, since such instruments are of well-known construction, and particularly since the actual construction of the instrument does not form a part of the present invention, further details of the construction and operation of the instrument are not set forth herein.

In accordance with the present invention, the sighting telescope 16 is provided with an indicator, generally designated 20, for indicating when the sighting telescope is exactly aligned with the sun. Briefly, indicator 20 includes a shadow-producing-member 21 fixed to the sighting telescope so as to produce a shadow by the sun at a location corresponding to the angular position of the sighting telescope with respect to the sun, and a reference member 22 also fixed to the sighting telescope such as to have the shadow cast at a predetermined location thereon when the shadow-producing-member 21 is axactly aligned with the sun.

Figure 2:
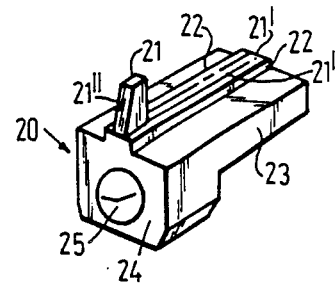

Indicator 20 is more particularly illustrated in FIG. 2, wherein it will be seen that the shadow-producing-member 21 is in the form of a vertically-extending post, and the reference member 22 includes a horizontally-extending surface on which the shadow from post 21 is cast; the latter shadow is indicated at 21' in FIG. 2. Both the shadow-producing post 21 and the reference member 22 are integrally formed on a common base 23 having a central bore 25, defining a sleeve for mounting to the sighting telescope 16 of the instrument illustrated in FIG. 1.

Post 21 is of rectangular configuration in vertical cross-section and is located at the front end of the reference member 22: the latter is defined by a horizontally-extending rib formed in the upper face of base 23. The shadow-producing post 21 is of a width slightly less than that of rib 22 so as to cast a shadow 21' of the same rectangular configuration as the vertical cross-section of post 21 on the upper surface of rib 22. Since the width of post 21 is slightly less than that of the upper horizontal surface of rib 22, it will be seen that when the post 21 is exactly aligned with the sun, shadow 21' will be located exactly in the centre of the upper horizontal surface of rib 22, and will be straddled by equally-dimensioned unshaded side margins, as shown at 22'.

Post 21 and rib 22 may be precisely machined so as to be integral with the base 23 of the indicator 20, with the front end of base 23 extended downwardly to define a front wall 24. The latter wall is machined with a central bore 25 to define a sleeve for mounting it to sighting telescope 16. The opposite side faces of post 21 are precisely machined so as to be perfectly flat and precisely parallel to each other and thereby to cast a well defined rectangular shadow 21' on the upper face of rib 22. The front face 21'' of post 21 is preferably tapered inwardly from bottom to top so that the bottom of the post is of larger dimension than the top in the direction parallel to the longitudinal axis of rib 22, as shown particularly in FIG. 1, for strengthening purposes.

It will thus be seen that the sighting telescope 16 of the instrument may be moved to bring it into alignment with the sun. As soon as it is in exact alignment with the sun, post 21 produces a shadow 21' (FIG. 2) which is exactly centered on the upper face of rib 22, this being readily discernable when the two margins 22' on the opposite sides of the cast shadow 21' are of equal dimensions. As mentioned earlier, it has been found that the human eye and the human mind can make this comparison very quickly and very accurately, and therefore instruments equipped with the indicator as illustrated in FIGS. 1 and 2 permit much higher accuracy in determining true bearing as compared, for example, to the previous known optical directors, as well as the commonly used magnetic and gyro compasses.

Figure 3:
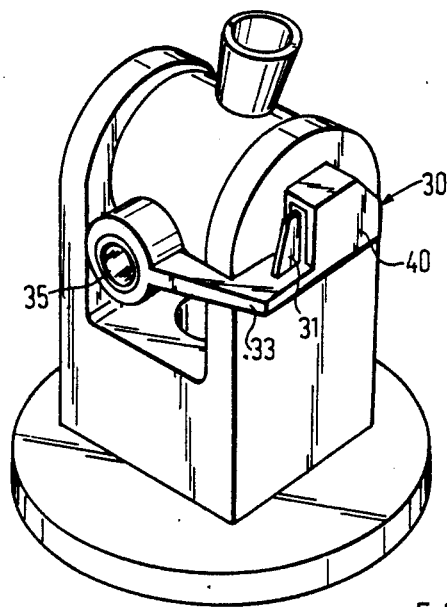

FIG. 3 illustrates another type of indicator, therein generally designated 30, which may be used in this type of instrument; and FIGS. 4a and 4b illustrate the construction of such an indicator. Briefly, the indicator of FIGS. 3, 4a and 4b is of very similar construction and operates on exactly the same principle as that described above with respect to FIGS. 1 and 2, except that the indicator member, generally designated as 30, FIG. 4a, is mounted laterally of the sighting telescope 16, rather than overlying it as in FIGS. 1 and 2; also, the indicator includes a hood, generally designated as 40 in FIG. 4b, is optionally provided for shielding the shadow producing member and the reference member from extraneous light.

More particularly, the shadow-producing-member 31 in the arrangement illustrated in FIGS. 3, 4a and 4b, is also in the form of a vertically-extending post secured to the front end of the reference member 32. The latter member is also in the form of a rib 32 integrally formed on a common base 33. Also as in FIGS. 1 and 2, base 33 includes a sleeve 35 for mounting same to the sighting telescope (16 in FIG. 1). In the arrangement of FIGS. 3, 4a and 4b, however, mounting sleeve 35 is carried at one end of an arm 36 extending laterally from base 33, and also includes a pair of clamping jaws 37 to enable the indicator to be mounted directly to, and laterally of, the instrument sighting telescope.

Hood 40 protects post 31 and reference member 32 from extraneous light. Hood 40 is formed from a solid block machined with a centre slot 41 slightly wider than the shadow-producing post 31, which slot 41 is further widened at the bottom as shown at 42 to accommodate the reference rib 32. Thus, the block so machined defines two side walls 43, 44, joined by a top wall, 45; all these walls shield post 31 and rib 32 from extraneous light. In addition, the rear upper side of the block is machined along a tapered line to define a tapered surface 46 facilitating the viewing of the shadow cast by post 31 on the upper surface of rib 32.

It will of course be appreciated that hood 40 may be omitted if this shielding is not necessary, and that such a hood could also be provided with respect to indicator 20 illustrated in FIGS. 1 and 2.

FIG. 5 illustrates a further form of indicator that may be used. In the arrangement of FIG. 5, the shadow-producing-member is constituted of a vertically-extending front wall 51 formed with a vertically-extending slit 51'; and the reference member is constituted of a rib formed on the upper face of the common base 53. Thus, when indicator 50 of FIG. 5 is exactly aligned with the sun, wall 51 forms a shadow centrally of the upper face of rib 52; however, in this case the shadow appears on the outer margins of the upper face of rib 52, whereas the central area of this surface is lit by the strip of light passing through slit 51' in wall 51.

FIG. 6 illustrates a different indicator, generally designated 60, which may be used. In the indicator of FIG. 6, the shadow-producing-member is also defined by a vertically-extending plate 61, as in FIG. 5, except that this plate is formed with an aperture 61', rather with the slit 51'. The reference member in the arrangement illustrated in FIG. 6 is the form of another vertically-extending plate 62 which has a marking 62' on it to be lit by the light passing through opening 61' when indicator 60 is exactly aligned with the sun. Thus, when this occurs, wall 61 of the indicator would cast a shadow blocking the light from the complete face of wall 62 at the rear end of the indicator, except for the point indicated by marking 62', which point would be lit by the light passing through opening 61'.

Both the front shadow-producing wall 61, and the rear reference wall 62, are preferably integrally formed with the base 63 of the indicator. The device illustrated in FIG. 6, as well as that illustrated in FIG. 5, could include either of the attaching arrangements illustrated in FIGS. 1, 2 and 3, 4a, 4b, respectively, and could also include the hood of the latter arrangement, if desired.

While the invention has been described with respect to several preferred embodiments, it will be appreciated that many other variations, modifications and applications of the invention may be made.

Particularly it must be borne in mind that the new device for determining true bearing using the sun as a reference can be used independently of whatever other instrument. In the case, e.g. of determining the direction in which an antenna should face, the new device—e.g. by means of sleeve is simply affixed to the antenna mast.

I claim:

1. An instrument for determining true bearing during daytime using the sun as a reference, comprising:
   a reference member including a rectangular horizontal surface;
   a vertical post for producing a shadow, the post having a rectangular horizontal cross section and attached to the reference member to project vertically from the rectangular horizontal surface such that the sun casts a shadow of the post upon the rectangular horizontal surface;
   the post being positioned to cast said shadow on a predetermined location of the rectangular horizontal surface when the post is exactly aligned with the sun; at exact alignment, the shadow falling centrally upon the rectangular horizontal surface and being straddled by equally-dimensioned unshadowed side margins.

2. An instrument according to claim 1, wherein the rectangular horizontal surface has visible edges substantially parallel to the edges of the shadow when the shadow is cast in the predetermined location.

3. An indicator attachable to a device for indicating when the device is exactly aligned with the sun, the indicator comprising:
   a reference member including a rectangular horizontal surface;
   a vertical post for producing a shadow, the post having a rectangular horizontal cross section and attached to the reference member to project vertically from the rectangular horizontal surface such that the sun casts said shadow of the post upon the rectangular horizontal surface at a location corresponding to the angular position of said device with respect to the sun;
   the post being positioned to cast said shadow on a predetermined location of the rectangular horizontal surface when the post is exactly aligned with the sun; at exact alignment, the shadow falling centrally upon the rectangular horizontal surface and being straddled by equally-dimensioned unshadowed side margins.

4. An instrument for determining true bearing during daytime using the sun as a reference, comprising:
   a shadow producing member and an extending surface on which a shadow is cast associated therewith, the upper face of the extending surface upon which the shadow is cast being of rectangular configuration, the shadow producing member being positioned in a manner as to produce said shadow by the sun at a location on the extended surface so as to have the shadow cast at a predetermined location when the instrument is exactly aligned with the sun's center;
   the shadow producing member being an extended post having a rectangular configuration in a horizontal cross section, the post fixed to the extended surface to project therefrom so as to cast thereon said shadow centrally thereof and straddled by equally-dimensioned unshadowed side margins when the instrument vertically-extending post is exactly aligned with the sun's center.

5. The instrument according to claim 4, wherein the extended surface has visible edges substantially parallel to the edges of the shadow when the shadow is cast in the predetermined location.

6. Method for aligning a device with the sun comprising:
   providing a shadow-receiving surface;
   providing a shadow-producing member;
   creating a shadowed area on the shadow-receiving surface disposed between two unshadowed areas on the shadow-receiving surface, wherein the two unshadowed areas each have a smaller area than the shadowed area, by placing the shadow-producing member between the sun and the shadow-producing surface; and
   rotating the shadow-receiving surface and the shadow-producing member together as a unit until the two unshadowed areas on the shadow-receiving surface are substantially the same width.

7. The method of claim 6 wherein the shadow-producing member is a vertical post having a rectangular cross-section.

* * * * *